US 9,088,589 B2

(12) United States Patent
Moore

(10) Patent No.: US 9,088,589 B2
(45) Date of Patent: Jul. 21, 2015

(54) BIDIRECTIONAL USER NOTIFICATION SYSTEM FOR MEDIA QUALITY CONTROL

(75) Inventor: Sean Samuel Butler Moore, Hollis, NH (US)

(73) Assignee: Avaya Inc., Basking Ridge, NJ (US)

( * ) Notice: Subject to any disclaimer, the term of this patent is extended or adjusted under 35 U.S.C. 154(b) by 1700 days.

(21) Appl. No.: 11/535,710

(22) Filed: Sep. 27, 2006

(65) Prior Publication Data

US 2008/0084969 A1    Apr. 10, 2008

(51) Int. Cl.
*H04L 12/26* (2006.01)
*H04L 29/06* (2006.01)
*H04L 12/801* (2013.01)

(52) U.S. Cl.
CPC ............ *H04L 65/1083* (2013.01); *H04L 47/10* (2013.01); *H04L 65/80* (2013.01)

(58) Field of Classification Search
USPC ......... 370/252, 232, 235, 233, 234, 352, 356, 370/357, 358, 242, 244, 245, 250, 253; 704/228, 270.1, 200, 233, 234; 709/223, 224, 225, 226
See application file for complete search history.

(56) References Cited

U.S. PATENT DOCUMENTS

| | | | | |
|---|---|---|---|---|
| 6,370,120 B1 * | 4/2002 | Hardy | ........................ | 370/252 |
| 7,075,981 B1 * | 7/2006 | Clark | ........................ | 375/224 |
| 7,085,230 B2 * | 8/2006 | Hardy | ........................ | 370/232 |
| 7,260,384 B2 * | 8/2007 | Bales et al. | ................... | 455/413 |
| 2005/0030970 A1 * | 2/2005 | Britton et al. | ................ | 370/462 |
| 2008/0060030 A1 * | 3/2008 | Chang et al. | .................... | 725/92 |

* cited by examiner

*Primary Examiner* — Dady Chery
(74) *Attorney, Agent, or Firm* — Muncy, Geissler, Olds & Lowe, P.C.

(57) ABSTRACT

A bidirectional notification system and method for improving the quality of media in a packet switched transmission network are disclosed. The end user of the packet switched network detects impairments in the media and initiates a pull message to a media quality control system disposed between the end user and the packet switched transmission network. The pull message causes the detection subsystem of the media quality control system to improve the media flow in order to mitigate the impairment detected by the end user. The detection subsystem of the media quality control system may also detect impairments in the media without input from the end user and launch a push message in response to the detection of the impairment. The push message announcing the impairment is provided to the end user with either an audio or visual message.

18 Claims, 5 Drawing Sheets

CONVENTIONAL ART

BIDIRECTIONAL USER NOTIFICATION SYSTEM FOR MEDIA QUALITY CONTROL

BACKGROUND OF THE INVENTION

1. Field of the Invention

The present invention relates to a method for improving the quality of packet switched transmissions, and more particularly to a notification system that informs either the end user or control path system of transmission impairment issues in a packet switched network. The present invention more particularly relates to the field of IP telephony, and especially to media quality control systems that actively mitigate or eliminate sources of impairment to real-time (voice and video conferencing) media flows.

2. Description of the Relevant Art

FIG. 1 depicts a schematic diagram of a conventional telecommunications system 100. System 100 comprises telephones 101 and 109, Public Switched Telephone Networks (PSTN) subnetworks 102 and 108, Internet Protocol (IP) gateways 103 and 107, Internet Protocol network 104, and Internet Protocol endpoints 105 and 106, interconnected as shown. System 100 enables telephones 101 and 109 and endpoints 105 and 106, as well as other telecommunications terminals, to communicate with each other various kinds of media such as audio, video, and so forth. FIG. 1 illustrates an interconnection between PSTN's using IP network interconnectivity. Although not illustrated in FIG. 1, it should also be noted that IP networks using PSTN interconnectivity is common, and that an all-IP network without any PSTN interconnectivity is also possible. The present invention can be directed to the network of FIG. 1, as well as an IP networks using PSTN interconnectivity or an all-IP network without any PSTN connectivity.

Each of telephones 101 and 109 is a telecommunications terminal that is capable of making calls to or receiving calls from any other telecommunications terminal—PSTN-based or IP-based—in telecommunications system 100.

Public Switched Telephone Network subnetworks 102 and 108 are portions of the Public Switched Telephone Network (PSTN). Subnetwork 102 comprises access paths, switches, and transmission paths, in a combination of analog and digital technology, which enable telephone 101 to communicate with other terminals. Subnetwork 108 also comprises access paths, switches, and transmission paths, in a combination of analog and digital technology, which enable telephone 109 to communicate with other terminals. Each depicted portion of the PSTN might comprise wireline equipment, wireless equipment, or both wireline and wireless equipment.

Internet Protocol gateways 103 and 107 are nodes that act as access points into Internet Protocol network 104 for signals from PSTN subnetworks 102 and 108, respectively.

Each of Internet Protocol endpoints 105 and 106 is a packet-capable telecommunications terminal, such as an IP telephone, that communicates via the Internet Protocol. Each endpoint 105, 106 is capable of making calls to or receiving calls from any other telecommunications terminal—PSTN-based or IP-based—in telecommunications system 100.

Internet Protocol network 104 is a packet-switched network that is capable of transporting packets from one node to another. The transported packets can comprise voice or video signal information in their payloads and can also comprise Real-time Transport Protocol (RTP) headers, User Datagram Protocol (UDP) headers, or IP headers. When the packets comprise voice signal information with IP headers, they are often referred to as Voice over Internet Protocol (VoIP) packets, and the networks that transport the VoIP packets are often referred to as VoIP networks.

The service provided by a network path in network 104 can be characterized by its "quality of service," which, for the purposes of this specification, is defined as a function of the bandwidth, error rate, and latency from one node to another. For the purposes of this specification, the "bandwidth" from one node to another is defined as an indication of the amount of information per unit time that can be transported from the first node to the second. Typically, bandwidth is measured in bits or bytes per second. The bandwidth exhibited by the network can be compared to the bandwidth requirements of one or more media flows; the "bandwidth requirement" is the amount of information per unit time per media flow that has to be transported from the first node to the second, usually determined by the signal encoding protocol (e.g., G.711 for voice, etc.) that governs the particular media flow. For the purposes of this specification, the "error rate" from one node to another is defined as an indication of the amount of information that is corrupted as it travels from the first node to the second. Typically, error rate is measured in bit errors per number of bits transmitted or in packets lost per number of packets transmitted. For the purposes of this specification, the "latency" from one node to another is defined as an indication of how much time is required to transport information from one node to another, plus any packetization delays and buffering delays that accumulate at the endpoints. Typically, latency is measured in milliseconds. The quality of service provided by network 104 can vary based on the actual bandwidth, error rate, and latency experienced by the call or session that is being carried by network 104, in relation to the requirements for the bandwidth, error rate, and latency for the call or session.

The quality experienced in telecommunications system 100 can also depend on other factors. First, each of telephones 101 and 109 can influence audio call clarity through the quality of its loudspeaker and microphone, the loudness of the transmitted and received signal, and the acoustic echo generated between the loudspeaker and microphone. Second, where each of PSTN subnetworks 102 and 108 converts the analog voice signals from a telephone into digital signals to yield greater efficiency in the transmission backbone, digitizing those voice signals can affect the clarity. Third, each of gateways 103 and 107 can affect the clarity through its components such as speech codecs, silence suppression mechanisms, comfort noise generators, jitter buffers, and echo cancellers. And fourth, each of endpoints 105 and 106 also can affect the clarity through its components such as a speech codec, a silence suppression mechanism, and the quality of its loudspeaker and microphone. Many of the impairments that are presently experienced by telecommunications users are as the result of different networks, such as Voice over Internet Protocol networks versus the PSTN, having to interoperate with each other, where some of those networks—or at least the commercial application of those networks—are relatively new in telecommunications. Both the differences between the networks and the equipment that is necessary to enable the different networks to interoperate, such as gateways, are some of the causes of impairments, many of which were either imperceptible or nonexistent in a PSTN-only telecommunications environment.

Other configurations of "hybrid" telecommunications systems that comprise both PSTN and IP-based networks also exist in the art. For example, an IP network using PSTN interconnectivity or an all-IP network without any PSTN connectivity are possible. In those other systems, as in the telecommunications system described above and with respect to FIG. 1, both the PSTN and the gateways that bridge the PSTN and IP-based networks can be sources of impairments.

Compelling business metrics, such as cost, flexibility, and functionality, have driven a migration of real-time distributed applications (e.g., voice and video conferencing) from using circuit-switched or PSTN networks 102, 108 for media transmission to using IP-based packet-switched networks 104 for media transmission. Packet-switched transmission introduces new sources of media quality impairments; however, unlike legacy PSTN networks 102, 108 actions may be taken in a packet-switched network 104 to mitigate or eliminate the cause of impairment. For example, the path for the media flow between two phones 105, 106 may traverse a WAN interconnection that may be temporarily congested, causing noticeable delay and distortion from packet loss; however, the media flow path may be changed to use a non-congested WAN interconnection or rerouted through the Internet and thereby remove the source of impairment. Media quality control technology such as a Converged Network Analyzer ("CNA") and Inter-Gateway Alternate Router ("IGAR") by Avaya Inc. are capable of changing the path of media flow.

As used herein, the term "media quality control" means any technique or device for controlling or improving the quality of media transmitted across a network including path control hardware or methods, codecs, or echo cancellation, etc. Media quality control systems which provide path control typically include an impairment detection subsystem that monitors and measures media quality in a (enterprise) network. Typically, when quality measurement values (e.g., estimated MOS) cross thresholds, the subsystem notifies the media quality control subsystem, which then effects some change in the path to bypass the source of impairment. Such systems do not "work perfectly". There are gaps between the ideal/optimal system and the state-of-the-art system.

Impairment detection and source location is a complex problem, so impairments may occur that are noticeable to the (human) end users but that are not detected by the media quality control system, and therefore no action will be taken by the system to mitigate the problem. This category of gaps can be referred to as the "false negatives" category.

When the media quality control system detects impairments or suspects that impairments may occur, there may be a significant latency between the detection of the problem or potential problem and the action taken to mitigate the problem. During this latency period, at best the end users will be annoyed with the reduced quality of their communications experience, and at worst the end users will abandon the call. This category of gaps can be referred to as the "user feedback" category.

Existing solutions known in the art exhibit false negatives, and users who are annoyed by impairments associated with false negatives may abandon calls. Accordingly, there is a need for a bidirectional notification system that eliminates false negatives and reduces user annoyance and the probability that calls will be abandoned.

SUMMARY OF THE INVENTION

The notification system of the present invention provides a relatively large impact on both end users and the media quality control system. The notification system provides the end users with the capability (e.g., a software button on a user interface or an actual button on a telephone) to notify the media quality control system that an impairment is occurring. Thus, the end users perform the role of the detection system. In this context, human end users may be modeled as an ideal detection system, so the notification system closes the "false negative" category of gaps.

The notification system also provides the media quality control system with the capability (e.g., a visual indicator on a user interface) to notify the end users that it has detected a problem or that it suspects a problem may occur or be occurring, and that it will soon be effecting a change that will mitigate the impairment. Such notifications should reduce the annoyance factor of the end users and reduce the likelihood that the end users will abandon the call. Hence, the notification closes the "user feedback" category of gaps.

DESCRIPTION OF PREFERRED EMBODIMENTS

Figure 1:
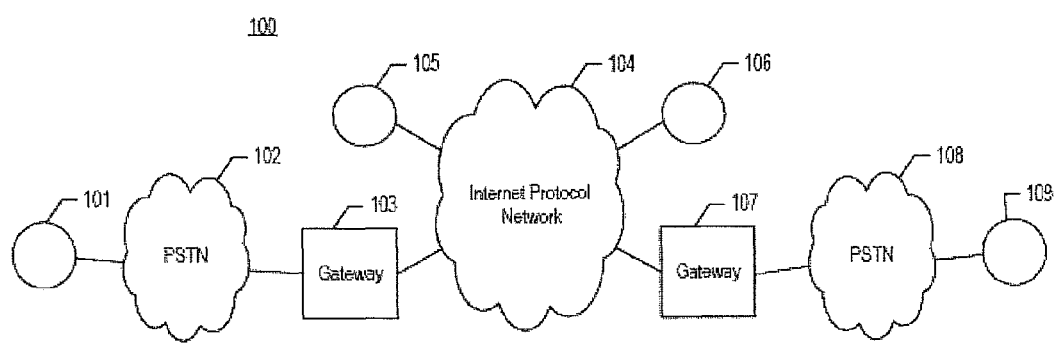
FIG. 1 illustrates a block diagram of a conventional telecommunications system that includes both PSTN and Internet networks.
Figure 2:
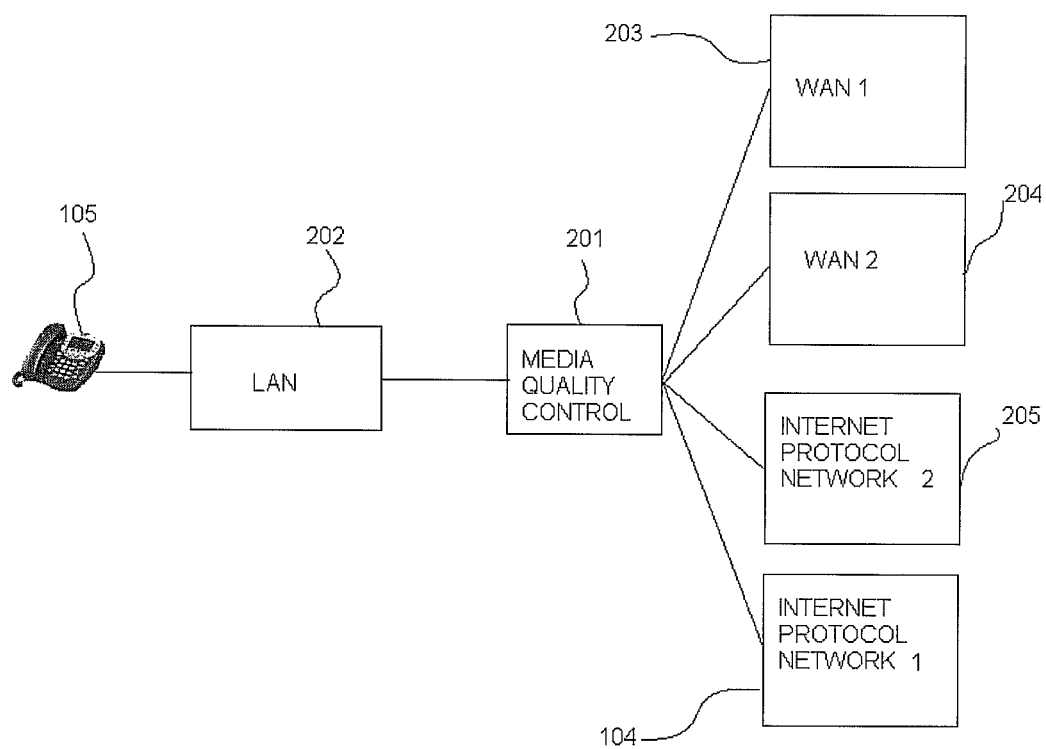
FIG. 2 is a simplified block diagram of a media quality control system.

Referring now to FIG. 2, a simplified block diagram illustrates the media quality control system 201 of the present invention. The preferred embodiment of the present invention includes a media quality control system that improves media flow through the network by controlling path flow. It should be noted that the present invention is directed to any technique or device for improving or controlling the quality of media flow and not just a path control system. The media quality control system 201 may improve the media flow by changing the path of media flow to or from a LAN 202 which may include a telecommunications device such as an IP telephone 105. Media quality control systems are known in the art, and may be obtained from vendors such as Avaya Inc. which sells Converged Network Analyzers ("CNA") and Inter-Gateway Alternate Routers ("IGAR") which are capable of changing the path of media flow to or from a LAN. It should be noted that gateways supporting IGAR devices are interconnected via the PSTN, so an IGAR action involves changing the PSTN path, not an IP network path. The present invention, however, includes media quality control techniques for changing both IP network paths as well as PSTN network paths, in order to improve media quality.

The media quality control system 201 can redirect or reroute the media flow to or from the LAN 202 along a plurality of different paths including a first WAN 203, a second WAN 204, an Internet Protocol Network 104 or an Internet Protocol Network 205. Alternatively, the media quality control system 201 can reroute the flow of media through different nodes within any of the networks 104, 205, 203 or 204. In other words, the media flow can be redirected among different networks or redirected to different nodes within the same network.

The notification system of the present invention is preferably bidirectional because notifications occur in both directions between end users of the IP telephone 105 and the media quality control system 201. Notifications from the end users to the media quality control system 201 shall be referred to as pull notifications, and conversely notifications from the media quality control system 201 to the end users shall be referred to as push notifications.

Figure 5:
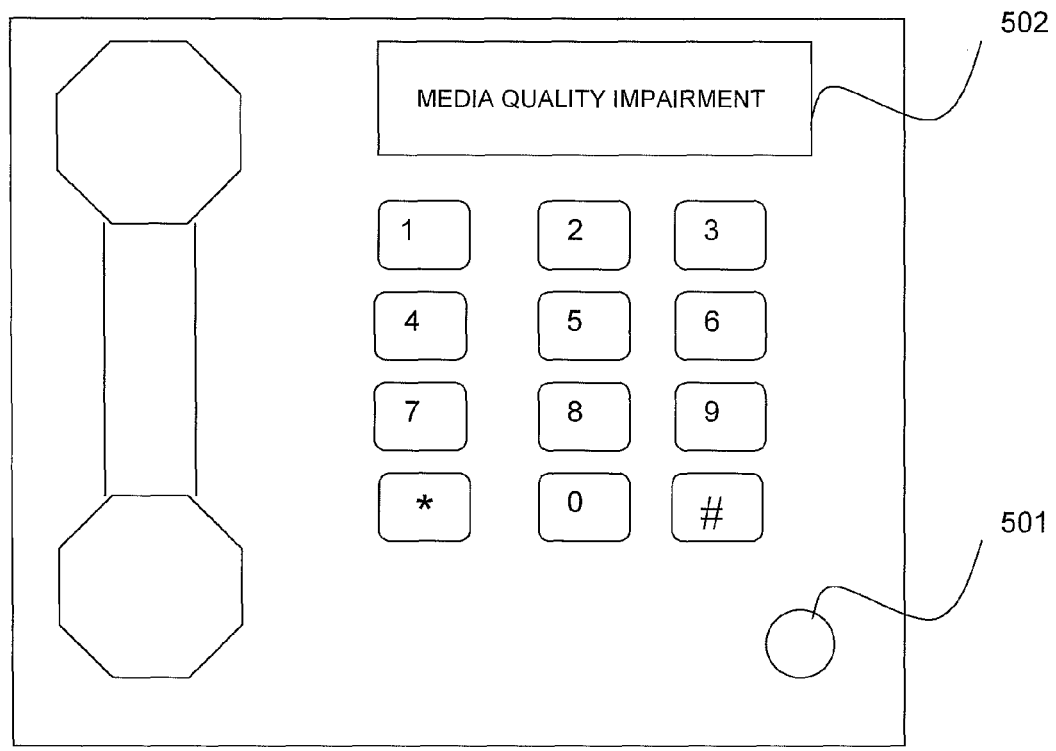
FIG. 5 is an illustration of an IP telephone that is adapted for use with the present invention.

Referring now to FIG. 5, the IP telephone 105 which is adapted for use with the present invention is illustrated in more detail. The IP telephone 105 may include a button 501. The pull notifications may be launched by clicking/pushing button 501, or by grabbing pull-down menus, etc. on a user interface. When the button 105 is pushed, a message is sent from the host implementing the launch mechanism to the media quality control system 201. Preferably, the message uses some protocol that is native to the host and media quality control system 201, such as a SIP or SOAP/web service message, instead of some proprietary/special-purpose protocol.

When the web services container that front-ends the media quality control system 201 receives a pull notification from the end user, the binding mechanism will cause the detection subsystem of the media quality control system 201 to react by notifying the media quality control subsystem that impairments are occurring. Under normal operating conditions, the media quality control subsystem will effect some path change to mitigate the impairment and improve the quality of the media flow.

Other techniques for controlling or improving the quality of the media flow include changing codecs, improving echo-cancellation through feedback, etc. For example, a user dials into a conference call using a cell phone. The air link is noisy, and hence the signal introduced by the cell phone and mixed in to the conference makes the entire conference noisy. The cell phone signal may be transported through a network, portions of which are an IP network. The IP network may not be contributing any impairments, yet the quality of the signal is poor. The poor quality may be detected either automatically or by a conferee that signals poor quality (e.g., by pushing a button). The quality control system may take an action different from a path-control action (in fact, in this case, a path control action will probably not mitigate the problem); for example, it may notify the conference administrator to mute the offending signal so that it does not get mixed in with the conference.

Figure 3:
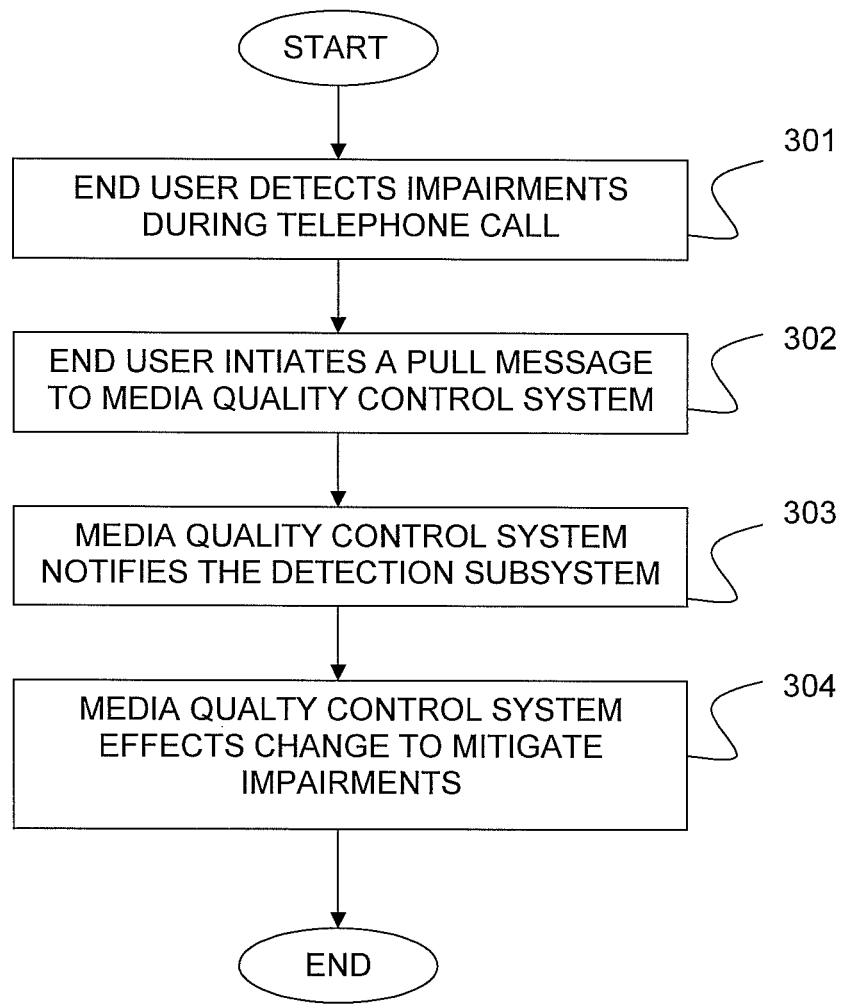
FIG. 3 is a flow diagram for generating a pull message associated with the present invention.

Referring now to FIG. 3, a flow chart illustrates the steps for notifying the media quality control system 201 of impairments. In step 301, the end user detects the impairment by hearing degraded audio on a speaker or handset or by seeing degraded video on a display. In step 302, the end user initiates a pull message to the media quality control system 201 by actuating a button on a software interface or an actual button on a hardware device. In step 303, the media quality control system 201 responds to the end user initiated pull message by notifying its detection subsystem that an impairment is occurring. The pull notification causes the (automatic) detection system, and therefore the media quality control system to behave as if the automatic detection system notified it instead of the user's pull notification. In other words, the media quality control system may be told by either the automatic detection subsystem or the human user (via a pull notification) that a media-quality problem is occurring. In step 304, the media quality control system 201 effects a path change to mitigate the impairments experienced by the end user. In addition to responding to a pull message, the media quality control system 201 of the present invention is also able to launch push notifications.

A push notification will be launched by the media quality control system 201 logic and sent as a message, e.g., using the WS-Notification or WS-Eventing protocol, to the hosts executing the communications application used by end users participating in an impaired session. When end-user hosts receive the push messages, the application will change the state of some visual, audio, or text indicator that is part of the user interface. For example, a display 502 on the IP telephone 105 of FIG. 5 may display a message such as "MEDIA QUALITY IMPAIRMENT" or "AUDIO/VISUAL IMPAIRMENT". The message may also include other information which reassures the end user that corrective action is being taken. Alternatively or in conjunction with the displayed message, the IP telephone may emit a visual signal, such as a flashing light, or audible signal indicating the existence of the impairment. The display 502 may also be utilized when the user sends a pull notification. For example, the media quality control system 201 could choose to send a push message/notification, thereby notifying the user that his/her notification was received.

Figure 4:
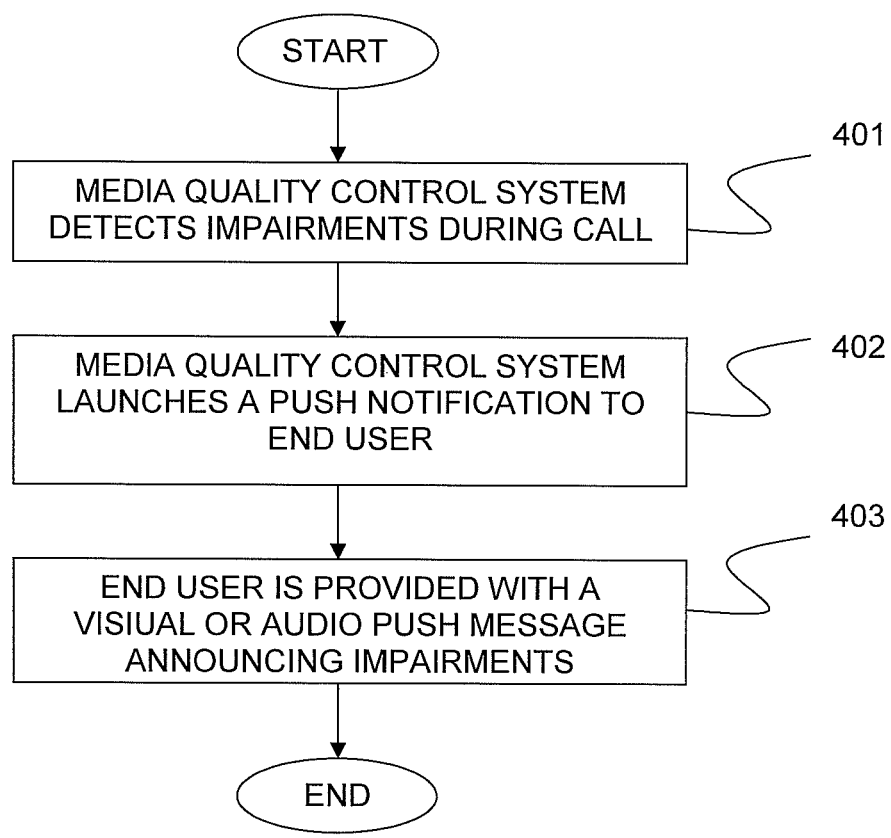
FIG. 4 is a flow diagram for generating a push message associated with the present invention.

Referring now to FIG. 4, a flow chart illustrates the steps for launching a push notification from the media quality control system 201. In step 401, the media quality control system 201 detects impairments using its detection subsystem. In step 402, the response of the media quality control system 201 to the impairment includes launching the push notification. In step 403, the end user is provided with the visual or audio message announcing the impairment.

Both the push and pull messages may include additional information related to the impairment current context, or state. In a pull message, such information may be used to assist the media quality control system 201 in identifying the impairment source and the appropriate corrective action. In a push message, such information may be used to provide richer feedback to the end users. If the end user is notified that the system is aware of an impairment and if the end user perceives that efforts are underway to alleviate the impairment, then the user is less likely to become frustrated and abandon the telephone call.

The invention has been described with reference to exemplary embodiments. However, it will be readily apparent to those skilled in the art that it is possible to embody the invention in specific forms other than those of the embodiments described above. This may be done without departing from the sprit of the invention. The exemplary embodiments are merely illustrative and should not be considered restrictive in any way. The scope of the invention is given by the appended claims, rather than the preceding description, and all variations and equivalents which fall within the range of the claims are intended to be embraced therein.

What is claimed is:

1. A notification method for improving the quality of a media flow in a packet switched transmission network, comprising:

detection by the end user of an impairment in the media received by the end user from the packet switched transmission network;

initiation by the end user of a pull message to a media quality control system disposed between the end user and the packet switched transmission network; and causing the media quality control system to improve the media flow in response to the pull message, in order to mitigate the impairment detected by the end user, wherein the end user initiates a pull message via a hardware button.

2. A notification method according to claim 1, further comprising:

detection by the media quality control system of an impairment in the media provided to the end user;

launching a push message by the media quality control system in response to the detection of the impairment; and providing to the end user the push message announcing the impairment.

3. A notification method according to claim 2 where the media quality control system includes a path control system.

4. A notification method according to claim 2 where the media quality control system includes a system for changing codecs.

5. A notification method according to claim 2 where the media quality control system includes a system for echo cancellation.

6. A notification method according to claim 2, wherein the user is provided with either an audio or visual push message.

7. A notification method according to claim 6, wherein the user is provided with the visual push message and the visual push message is displayed on a display and includes text announcing the impairment and describing the status of the impairment.

8. A notification method according to claim 6, wherein the user is provided with the audio message.

9. A notification method according to claim 2, wherein the end user is provided with a push message acknowledging the receipt of the end user initiated pull message.

10. A notification method according to claim 2 wherein the detection by the media quality control system of an impairment in the media provided to the end user occurs in response to the pull message.

11. A notification method according to claim 1, wherein the media quality control system includes a detection subsystem and causes its detection subsystem to react in response to the pull message.

12. A notification method according to claim 1 where the media quality control system includes a path control system.

13. A notification method according to claim 1 where the media quality control system includes a system for changing codecs.

14. A notification method according to claim 1 where the media quality control system includes a system for echo cancellation.

15. A notification method according to claim 1, wherein the end user is provided with a push message acknowledging the receipt of the end user initiated pull message.

16. A notification method according to claim 15 where the media quality control system includes a path control system.

17. A notification method according to claim 15 where the media quality control system includes a system for changing codecs.

18. A notification method according to claim 15 where the media quality control system includes a system for echo cancellation.

* * * * *